United States Patent
Alapuranen et al.

(10) Patent No.: US 8,175,079 B2
(45) Date of Patent: May 8, 2012

(54) DEVICE AND METHOD FOR REESTABLISHING A WIRELESS CONNECTION IN A WIRELESS NETWORK

(75) Inventors: Pertti O. Alapuranen, Lake Mary, FL (US); Pankaj Aggarwal, Lake Mary, FL (US); Donald L. Joslyn, Debary, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 522 days.

(21) Appl. No.: 12/412,734

(22) Filed: Mar. 27, 2009

(65) Prior Publication Data
US 2010/0246554 A1    Sep. 30, 2010

(51) Int. Cl.
*H04L 12/66* (2006.01)
(52) U.S. Cl. .................................................. 370/351
(58) Field of Classification Search .......... 370/216–228, 370/351, 389, 395.1, 395.2; 379/90.01, 100.01, 379/100.12; 455/130, 268, 272, 277.1
See application file for complete search history.

(56) References Cited

U.S. PATENT DOCUMENTS

| | | | |
|---|---|---|---|
| 6,834,045 B1 | 12/2004 | Lappetelainen et al. | |
| 6,912,204 B2 | 6/2005 | Kossi et al. | |
| 7,120,138 B2 | 10/2006 | Soomro et al. | |
| 7,594,020 B2 * | 9/2009 | Apreutesei et al. | 709/227 |
| 7,885,184 B2 * | 2/2011 | George et al. | 370/228 |
| 2005/0003765 A1 * | 1/2005 | Alfano et al. | 455/67.11 |
| 2007/0165519 A1 * | 7/2007 | George et al. | 370/225 |
| 2007/0178888 A1 * | 8/2007 | Alfano et al. | 455/414.1 |
| 2010/0027452 A1 * | 2/2010 | Skinner et al. | 370/311 |
| 2010/0238793 A1 * | 9/2010 | Alfano et al. | 370/216 |
| 2010/0290362 A1 * | 11/2010 | Croot et al. | 370/252 |

FOREIGN PATENT DOCUMENTS

EP    1257092 A1    11/2002

OTHER PUBLICATIONS

ETSI, "Annex D(Normative): DFS Parameters," EN 301 893, V1.4.1, 2007, pp. 54-55.
Federal Communications Commission (FCC), "Response Requirements," FCC Jun. 1996, section 5.3, published Jun. 30, 2006, p. 7.
Corresponding International Application No. PCT/US2010/026939—International Search Report with Written Opinion—mailing date Oct. 26, 2010.
International Preliminary Report on Patentability for corresponding PCT/US2010/026939—mailing date Sep. 27 2011.

* cited by examiner

*Primary Examiner* — Chi Pham
*Assistant Examiner* — Fan Ng
(74) *Attorney, Agent, or Firm* — Randi L. Karpinia

(57) ABSTRACT

A device and method enable reestablishing a wireless connection in a wireless network. A first wireless device detects that a previous wireless connection has been lost with a second wireless device that employs dynamic frequency selection (DFS). The first wireless device then uses a routing table to identify a third wireless device as a next hop of a route to the second wireless device, and transmits a request message to the third wireless device, where the request message requests identification of a current DFS channel over which the second wireless device is operating. Next, the first wireless device receives a response message from the third wireless device, where the response message identifies the current DFS channel over which the second wireless device is operating. Using the current DFS channel, the first wireless device establishes a new wireless connection with the second wireless device.

18 Claims, 4 Drawing Sheets

DEVICE AND METHOD FOR REESTABLISHING A WIRELESS CONNECTION IN A WIRELESS NETWORK

FIELD OF THE DISCLOSURE

The present invention relates generally to wireless communication networks, and in particular to reestablishing a wireless connection that was temporarily lost due to dynamic frequency selection (DFS) radar avoidance measures.

BACKGROUND

Worldwide Internet access now includes more than 1.2 billion users. In concert with this growth, wireless broadband services have begun to proliferate in cities and rural communities where access was previously unavailable. Businesses around the world are also beginning to offer high-speed Internet access in restaurants, hotels, airports and other public gathering places.

Recognizing the trajectory of the growth of wireless broadband services, regulatory bodies around the world have opened new spectrum in the 5 Giga Hertz (GHz) frequency band to stimulate the availability of broadband services, increase competitive choices and improve overall quality of service (QoS). In the 5.4 GHz band, over 225 Mega Hertz (MHz) of new spectrum was released in the United States, Europe and Brazil, and 150 MHz in Canada and Australia for unlicensed/managed devices. These devices use wideband digital modulation techniques to provide a wide array of high data rate mobile and fixed communications.

However, in many countries, wireless broadband networks and radar systems occupy the same 5 GHz frequency bands. Ensuring that interference from broadband networks does not interrupt the operations or performance of radar systems is of paramount importance. Thus a series of regulations were developed independently by a number of telecommunications regulators in various countries, including the United States, Europe, Brazil, Canada and Australia. The regulations enable coexistence of overlapping broadband networks and radar systems.

The regulatory requirements dictate that wireless broadband infrastructure and devices make use of dynamic frequency selection (DFS) radar avoidance measures to eradicate interference with government radar systems occupying the same frequency band. DFS is a feature that continually scans a frequency band and selects a channel that is not already in use. Prior to the start of a broadcast, a device equipped with DFS scans the radio surroundings for the presence of radar. If the device encounters a radar signal, it must either select another channel or enter a "sleep mode" if another channel is not available.

While DFS is highly effective at safeguarding systems and enabling coexistence between broadband networks and radar systems, effective DFS implementation methods are essential to ensure consistent and reliable outcomes for network operators. Implementation methods are complicated by the fact that countries have specified different implementation schemes, resulting in essentially two main types of DFS standards. In the United States, Canada and Australia, DFS applies only to access points and backhaul masters. For countries in the European Union and Brazil, DFS applies to access points, backhaul masters, subscriber modules and backhaul slaves.

According to some DFS specifications, when a device operating in a 5.5 GHz band identifies radar signals, it is allowed to continue operating for 260 ms to close the channel. At the end of this interval the device should search for a new channel on which to resume the operation. The check for the availability of the new channel should continue for at least one minute. Thus after a device identifies radar signals it has to warn other devices in the network that radar signals have been identified and then stop transmitting. Other devices in the network should receive the warning and should move to a new frequency where they should start a similar one minute check before transmitting any signal. If the newly selected channel is not acceptable for a particular node, that particular node must communicate that fact to the rest of the network in order to find another channel. However, because no transmission can be made before ensuring that no radar installation operates in the same frequency, it is difficult to establish coordinated communication between network nodes.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
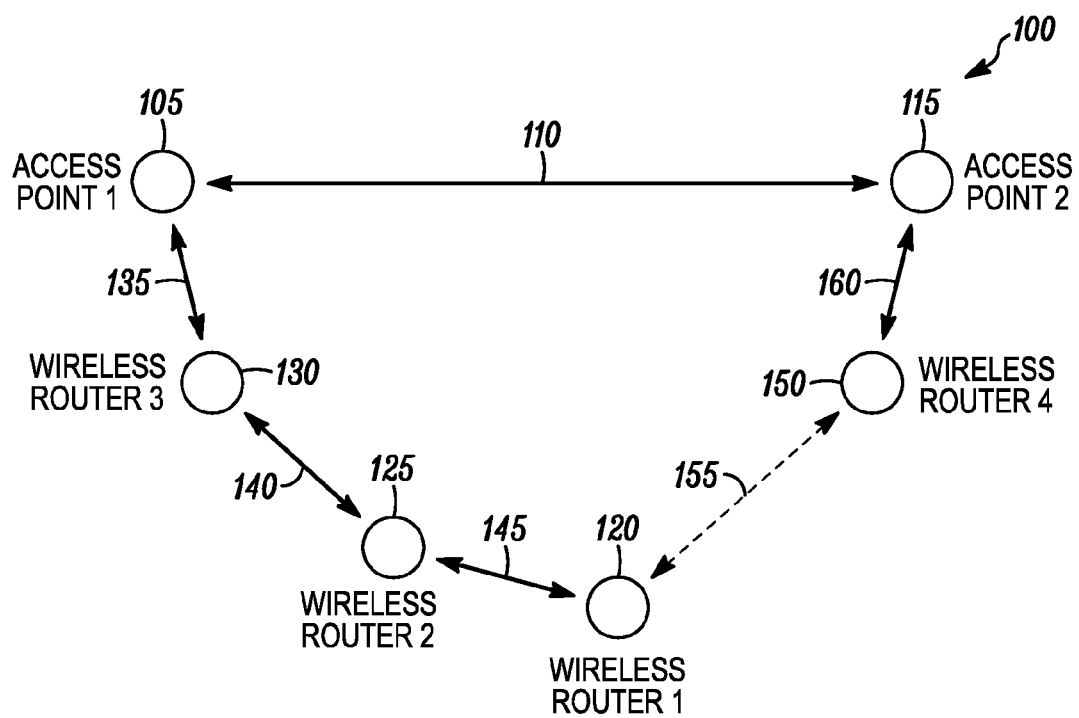
FIG. 1 is a diagram illustrating communications in a wireless communication network, according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, a method enables reestablishing a wireless connection in a wireless network. The method includes detecting at a first wireless device that a previous wireless connection has been lost with a second wireless device that employs dynamic frequency selection (DFS). A third wireless device is then identified from a routing table of the first wireless device as a next hop of a route to the second wireless device, and a request message is transmitted from the first wireless device to the third wireless device, where the request message requests identification of a current DFS channel over which the second wireless device is operating. Next, a response message is received at the first wireless device from the third wireless device, where the response message identifies the current DFS channel over which the second wireless device is operating. Using the current DFS channel, a new wireless connection is then established at the first wireless device with the second wireless device.

Embodiments of the present invention thus enable effective reestablishment of wireless connections that are lost due to DFS triggers, while accelerating convergence of new network routes and avoiding unnecessary physical channel scans. By conducting "virtual channel scans" using known neighboring network nodes identified in a routing table, inefficiencies associated with physical channel scans, including disrupted communications and poor quality of service (QoS), can be reduced.

Referring to FIG. 1, a diagram illustrates communications in a wireless communication network 100, according to some embodiments of the present invention. A backhaul device in the form of a first access point 105 is connected over a wired communication link 110 to another backhaul device in the form of a second access point 115. Also, a first wireless router 120 is indirectly connected to the first access point 105 through both a second wireless router 125 and a third wireless router 130. Thus a wireless communication link 135 connects the first access point 105 with the third wireless router 130, a wireless communication link 140 connects the third wireless router 130 with the second wireless router 125, and a wireless communication link 145 connects the second wireless router 125 with the first wireless router 120.

A routing table (not shown) of the first wireless router 120 includes an entry for a fourth wireless router 150. As indicated by the dashed line 155, the first wireless router 120 is thus capable of establishing communications with the fourth wireless router 150. The fourth wireless router 150 then maintains a wireless communication link 160 with the second access point 115.

The first wireless router 120 is communicating with the first access point 105 through the second and third wireless routers 125, 130 using a dynamic frequency selection (DFS) channel. The wireless communication links 135, 140, 145 are thus all using the same DFS channel. Thus if the first access point 105 is required to change channels due to a DFS trigger, all of the first, second and third wireless routers 120, 125, 130 will lose connectivity with the first access point 105. As described in detail below, embodiments of the present invention enable a wireless connection to be efficiently and quickly reestablished between the first wireless router 120 and the first access point 105 after such a DFS trigger.

Wireless networks, such as the wireless communication network 100, that implement embodiments of the present invention can utilize various types of wireless network architectures including a mesh enabled architecture (MEA) network, or an Institute of Electrical and Electronics Engineers (IEEE) 802.11 network (i.e. 802.11a, 802.11b, 802.11g, 802.11n). (Note: for any IEEE standards recited herein, see: http://standards.ieee.org/getieee802/index.html or contact the IEEE at IEEE, 445 Hoes Lane, PO Box 1331, Piscataway, N.J. 08855-1331, USA.) It will be appreciated by those of ordinary skill in the art that such wireless communication networks can alternatively comprise any packetized communication network where packets are forwarded across multiple wireless hops. For example, such a wireless communication network can be a network utilizing multiple access schemes such as OFDMA (orthogonal frequency division multiple access), TDMA (time division multiple access), FDMA (Frequency Division Multiple Access), or CSMA (Carrier Sense Multiple Access).

As known by those having ordinary skill in the art, mesh networks are based on self-configuring autonomous collections of portable devices that communicate with each other over wireless links having limited bandwidths. A mesh network is a collection of wireless nodes or devices organized in a decentralized manner to provide range extension by allowing nodes to be reached across multiple hops. In a mesh network, communication packets sent by a source node thus can be relayed through one or more intermediary nodes before reaching a destination node. Mesh networks may be deployed as temporary packet radio networks that do not involve significant, if any, supporting infrastructure. Rather than employing fixed base stations, in some mesh networks each user node can operate as a router for other user nodes, thus enabling expanded network coverage that can be set up quickly, at low cost, and which is highly fault tolerant. In some mesh networks, special wireless routers also may be used as intermediary infrastructure nodes.

Figure 2:
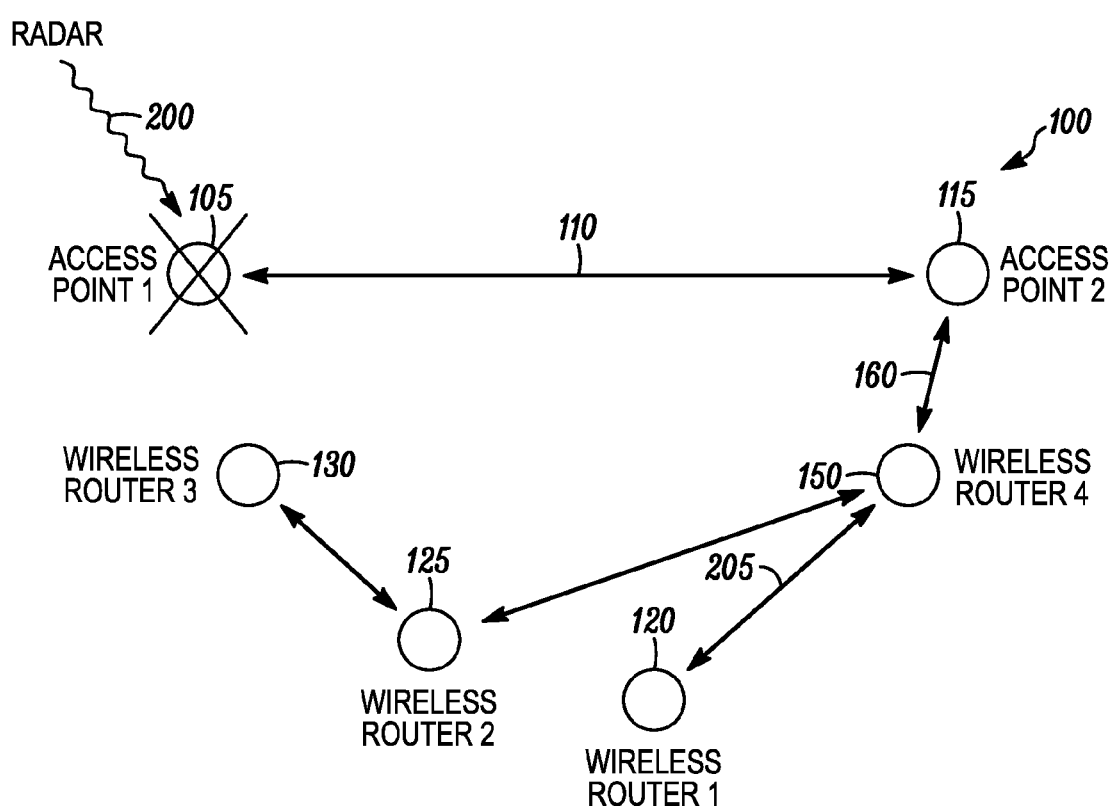
FIG. 2 is a network diagram further illustrating communications in the wireless communication network of FIG. 1, after a first access point has experienced a dynamic frequency selection (DFS) trigger, according to some embodiments.

Referring to FIG. 2, a network diagram further illustrates communications in the wireless communication network 100, after the first access point 105 has experienced a DFS trigger, according to some embodiments of the present invention. Consider that a radar signal 200 in the same DFS frequency band as the communication link 135 is received at the first access point 105. The radar signal 200 activates a DFS trigger at the first access point 105 and causes the first access point 105 to terminate all communications over the channel used for the communication link 135. An "X" drawn through the first access point 105 indicates that the communication link 135 has been lost. Thus, after the first access point 105 activates the DFS trigger, all of the first, second and third wireless routers 120, 125, 130 will lose connectivity with the first access point 105.

However, according to some embodiments of the present invention, the first wireless router 120 can then automatically transmit a request message to the fourth wireless router 150 over a wireless communication link 205 that uses a non-DFS frequency. Because the routing table of the first wireless router 120 includes an identity of the fourth wireless router 150, the request message can be sent immediately without a need for conducting a frequency scan. As known by those having ordinary skill in the art, a scan process generally requires a wireless router to switch to another channel and listen for beacon signals sent from available access points. Because multiple channels are often available to a network deployment, a considerable amount of time may be required to scan all possible channels and select a suitable network node for further communications. Such frequency scans can thus disrupt communications and decrease overall network quality of service (QoS).

After receiving the request message, the fourth wireless router 150 forwards the request message over the wireless communication link 160 to the second access point 115. The second access point 115 then forwards the request message over the wired communication link 110 to the first access point 105.

The request message can be a low bandwidth message that simply requests identification information about the present operating channel of the first access point 105. To avoid potential interference with nearby radar, the request message generally can be transmitted over a non-DFS channel. For example, if the wireless communication links 135, 140, 145 used a 5.4 GHz band DFS channel, then the communication link 205 may use a 2.4 GHz band non-DFS channel, or some other channel that may have a limited bandwidth but allows channel and other critical information to be transferred. When transmitting the request message the first wireless router 120 may retune a single radio from a DFS band to a non-DFS band or, if the first wireless router 120 is a multi-radio device, employ an independent second radio. However, it is also possible for the request message to be transmitted over a DFS channel. Due to different locations of the first access point 105 and the first wireless router 120, radar signals may be detected at different times or, for example where the first access point 105 operates in a high location such as on top of a building, a radar signal may interfere with the first access point 105 but not with the first wireless router 120.

After receiving the request message, the first access point 105 responds immediately by transmitting to the first wireless router 120, through both the second access point 115 and the fourth wireless router 150, a response message that identifies a current DFS channel over which the first access point 105 is operating. The first wireless router 120 is thus able to promptly and efficiently obtain current DFS channel operating information concerning the first access point 105, but without completing a physical channel scan of a radio spectrum. As used herein, a "current DFS channel" includes any channel used by a device that is currently subject to DFS radar interference avoidance measures.

As known by those having ordinary skill the art, routing tables are commonly used by wireless nodes in a wireless communication network to identify next hops for routing data packets to other nodes in the network. Routing protocols executed by network nodes assist in updating information in routing tables to ensure that routes described in a routing table are current and reliable. Thus the identification of neighboring nodes provided in a routing table generally defines an up-to-date topology of the network, and can define alternative routes to a destination.

According to some embodiments of the present invention, the identification of the fourth wireless router 150 in a routing table of the first wireless router 120 provides a reliable means for obtaining an alternate route to the first access point 105, and without a need for the first wireless router 120 to perform a physical frequency scan. The route from the first wireless router 120 to the first access point 105 via the fourth wireless router 150 exists in the routing table of the first wireless router 120 because that route was identified previously by routing protocols of the first wireless router 120. After the wireless communication link 145 is lost, the first wireless router 120 thus assumes that the route to the first access point 105 through the fourth wireless router 150 remains usable and automatically transmits the request message to the fourth wireless router 150.

Some embodiments of the present invention thus enable a "virtual channel scan" of alternative radio channels. Such a virtual channel scan effectively uses data in the routing tables of the first wireless router 120 to provide a new communication path to the first access point 105. By selecting known neighboring devices from the routing tables of the first wireless router 120, it is more likely that an alternative path to the first access point 105 will be efficient and reliable. Also, convergence of an alternative path to the first access pint 105 is accelerated.

Figure 3:
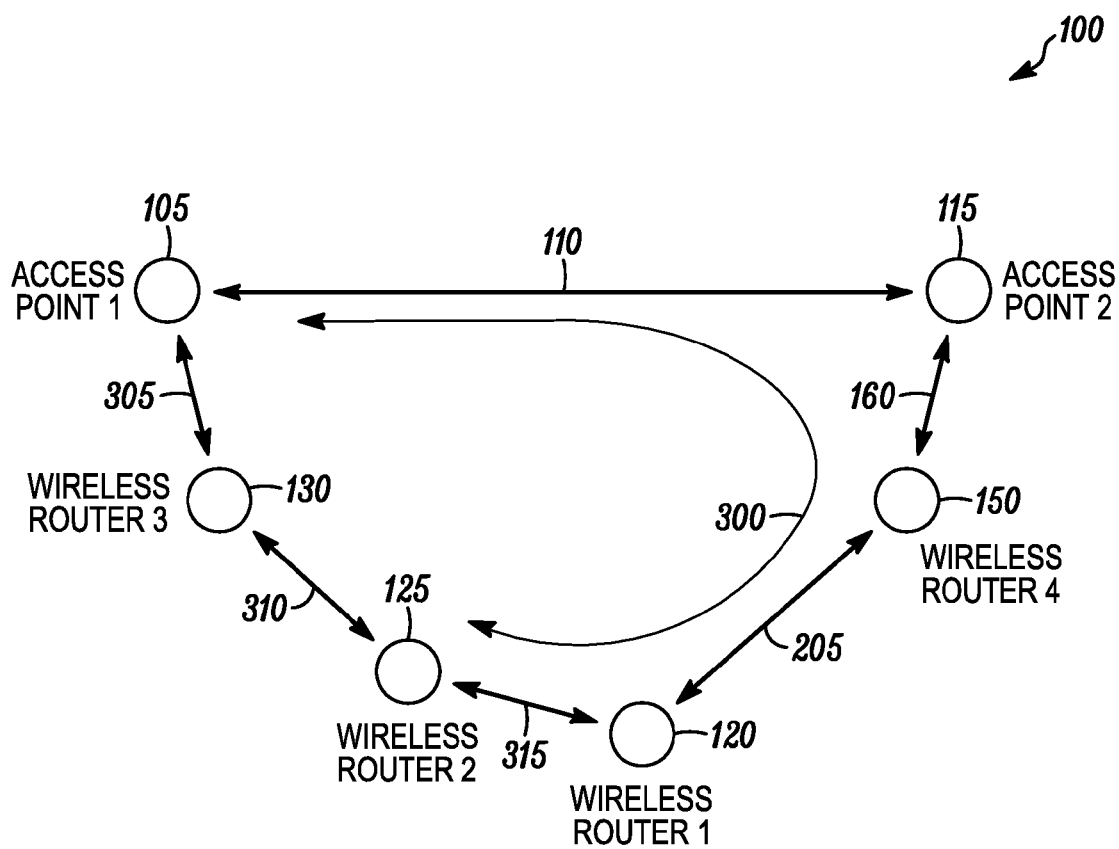
FIG. 3 is a network diagram further illustrating communications in the wireless communication network of FIG. 1, after a first wireless router has received a response message from a first access point, according to some embodiments.

Referring to FIG. 3, a network diagram further illustrates communications in the wireless communication network 100, after the first wireless router 120 has received a response message from the first access point 105, according to some embodiments of the present invention. As illustrated by the line 300, the response message may be relayed to the first wireless router 120 through the second access point 115 and the fourth wireless router 150. Similarly, the second wireless router 125 and the third wireless router 130 can obtain current DFS channel information for the first access point 105 by transmitting other request messages along the route shown by the line 300. However, alternatively, the first wireless router 120 can broadcast to the second wireless router 125 and the third wireless router 130 the current DFS channel information concerning the first access point 105 over the original frequency used for the wireless communication links 140, 145.

After the first, second and third wireless routers 120, 125, 130 all obtain information defining the current DFS channel over which the first access point 105 is operating, the first wireless router 120 can again establish DFS high bandwidth communications with the first access point 105 using new wireless communication links 305, 310, 315. Compared to the wireless communication links 135, 140, 145, the new wireless communication links 305, 310, 315 use a new available DFS frequency of the current DFS channel of the first access point 105.

Figure 4:
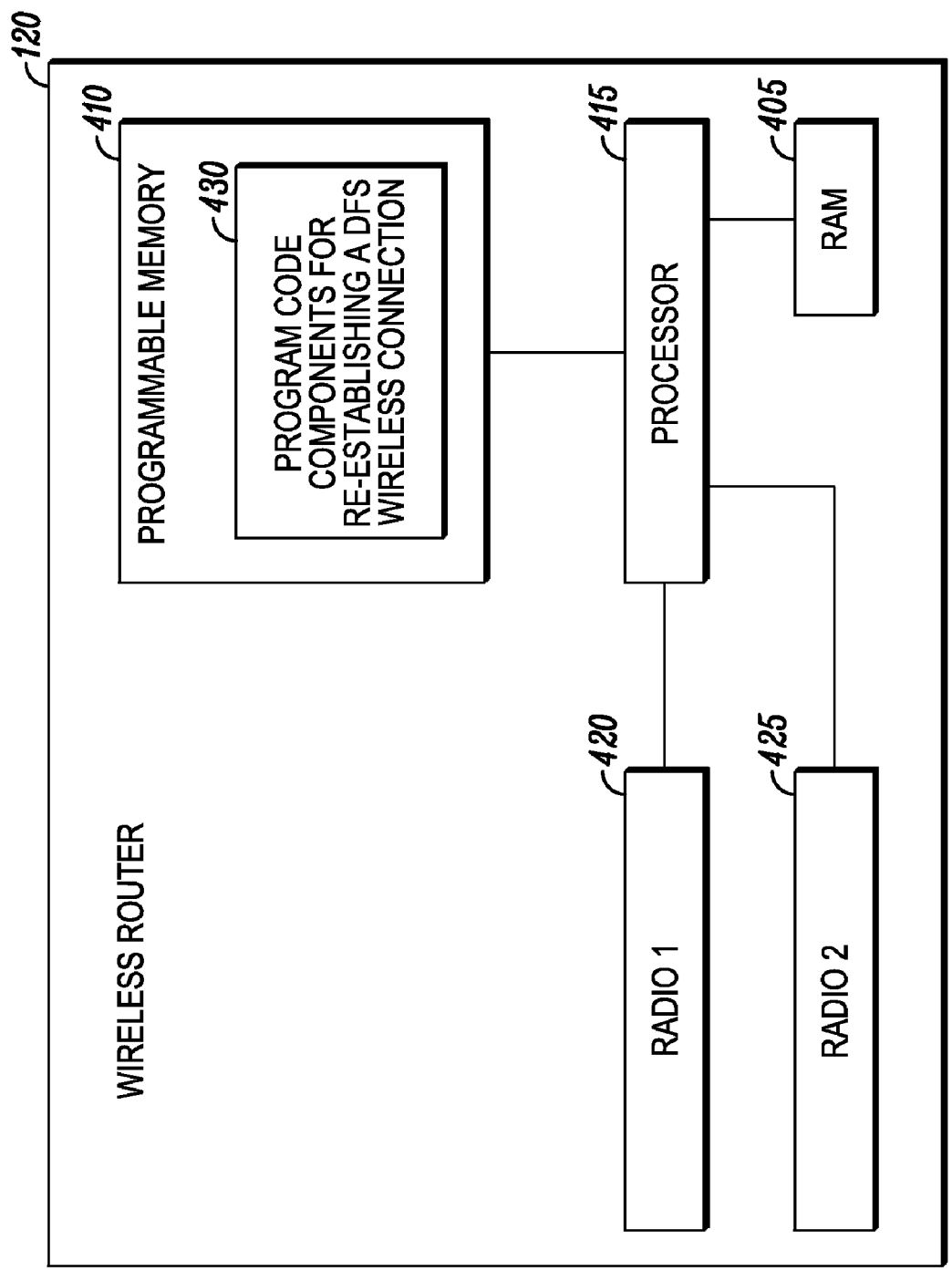
FIG. 4 is a block diagram illustrating components of a first wireless router, according to some embodiments.

Referring to FIG. 4, a block diagram illustrates components of the first wireless router 120 operating in the wireless communication network 100, according to some embodiments of the present invention. The first wireless router 120, for example, can be an integrated unit such as a computer, mobile telephone, handheld radio or personal digital assistant (PDA) containing at least all the elements depicted in FIG. 4, as well as any other elements necessary for the first wireless router 120 to perform its particular functions. Alternatively, the first wireless router 120 can comprise a collection of appropriately interconnected units or devices, wherein such units or devices perform functions that are equivalent to the functions performed by the elements depicted in FIG. 4.

The first wireless router 120 comprises a random access memory (RAM) 405 and a programmable memory 410 that are coupled to a processor 415. The processor 415 also has ports for coupling to a first radio 420 and to a second radio 425. For example, the first radio 420 can be used to enable the first wireless router 120 to communicate with other node devices in the wireless communication network 100 over DFS 5 GHz band channels, and the second radio 420 can be used to enable the first wireless router 120 to communicate with other node devices in the wireless communication network 100 over non-DFS 2.4 GHz band channels.

The programmable memory 410 can store operating code (OC) for the processor 415 and code for performing functions associated with a network device. For example, the programmable memory 410 can store computer readable program code components 430 configured to cause execution of a method for reestablishing a wireless connection in a wireless network as described herein.

Figure 5:
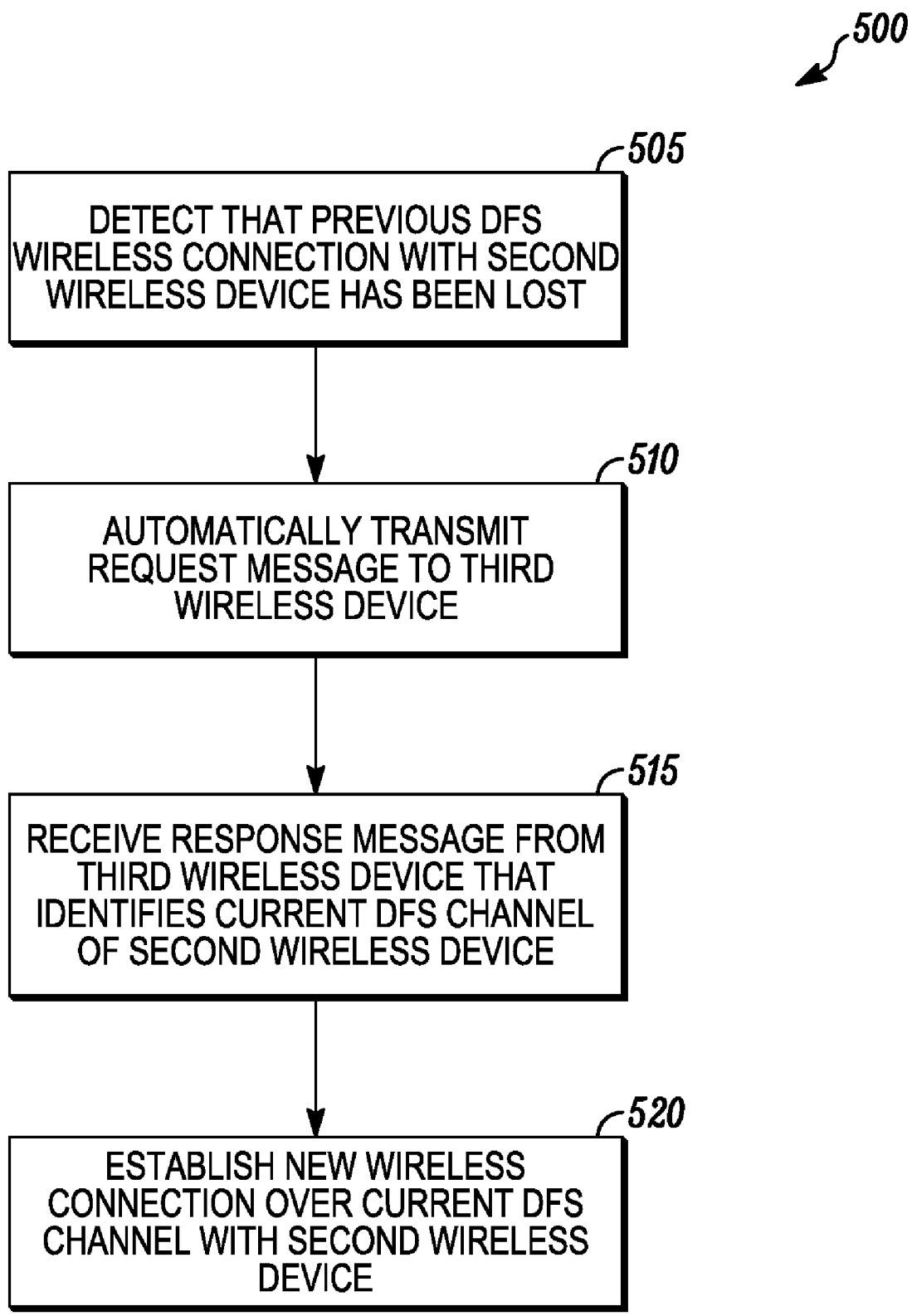
FIG. 5 is a general flow diagram illustrating a method for reestablishing a wireless connection in a wireless network, according to some embodiments.

Referring to FIG. 5, a general flow diagram illustrates a method 500 for reestablishing a wireless connection in a wireless network, according to some embodiments of the present invention. At step 505, a first wireless device detects that a previous wireless connection has been lost with a second wireless device that employs dynamic frequency selection (DFS). For example, the first wireless router 120 detects that a previous wireless connection over the wireless communication links 135, 140, 145 has been lost with the first access point 105.

At step 510, a third wireless device is identified, from a routing table of the first wireless device, as a next hop of a route to the second wireless device, and a request message is transmitted from the first wireless device to a third wireless device, wherein the request message requests identification of a current DFS channel over which the second wireless device is operating. For example, the first wireless router 120 identifies in its routing tables the fourth wireless router 150 as an alternative next hop in a route to the first access point 105. The first wireless router 120 then transmits a request message to the fourth wireless router 150 and requests an identification of a current DFS channel over which the first access point 105 is operating.

At step 515, a response message is received at the first wireless device from the third wireless device, wherein the response message identifies the current DFS channel over which the second wireless device is operating. For example, the first wireless router 120 receives a response message from the fourth wireless router 150, where the response message was forwarded from the first access point 105 and the second access point 115, and identifies a new DFS channel over which the first access point 105 is operating.

At step 520, using the current DFS channel, a new wireless connection is established with the second wireless device. For example, using the new DFS channel of the new wireless communication links 305, 310, 315, the first wireless router 120 establishes a new wireless connection with the first access point 105.

Advantages of some embodiments of the present invention therefore include enabling effective reestablishment of wireless connections that are lost due to DFS triggers, while accelerating convergence of new network routes and avoiding unnecessary physical channel scans. By conducting "virtual channel scans" using known neighboring network nodes identified in routing tables, inefficiencies associated with physical channel scans, including disrupted communications and poor quality of service (QoS), can be reduced.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, or contains a list of elements does not include only those elements but may include other elements not expressly listed or inherent to such process, method, article, or apparatus. An element preceded by "comprises a . . . ", "has a . . . ", "includes a . . . ", or "contains a . . . " does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The terms "coupled" or "connected" as used herein define a connection that is not necessarily direct but may be indirect. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and system described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for reestablishing a wireless connection in a wireless network, the method comprising:
    detecting at a first wireless device that a previous wireless connection has been lost with a second wireless device that employs dynamic frequency selection (DFS);
    identifying, from a routing table of the first wireless device, a third wireless device as a next hop of a route to the second wireless device and transmitting a request message from the first wireless device to the third wireless device, wherein the request message requests identification of a current DFS channel over which the second wireless device is operating;

receiving a response message at the first wireless device from the third wireless device, wherein the response message identifies the current DFS channel over which the second wireless device is operating; and establishing at the first wireless device, using the current DFS channel, a new wireless connection with the second wireless device.

2. The method of claim 1, wherein the request message and the response message are transmitted over a non-DFS channel.

3. The method of claim 1, wherein the previous wireless connection used a 5 GHz band DFS channel.

4. The method of claim 1, wherein the request message and the response message are transmitted over a 2.4 GHz band channel.

5. The method of claim 1, wherein the second wireless device functions as a network access point.

6. The method of claim 5, wherein the identity of the current DFS channel is received from the second wireless device through a second network access point.

7. The method of claim 1, wherein the previous wireless connection was through a first radio of the first wireless device and the request message is transmitted through a second radio of the first wireless device.

8. The method of claim 1, wherein the wireless network is a mesh network.

9. The method of claim 1, wherein the first wireless device broadcasts an identification of the current DFS channel to other network devices before establishing the new wireless connection with the second wireless device.

10. A first wireless device, comprising:
a processor;
at least one radio coupled to the processor;
wherein,
the processor is configured to detect that a previous wireless connection has been lost with a second wireless device that employs dynamic frequency selection (DFS);
the processor is configured to identify, from a routing table of the first wireless device, a third wireless device as a next hop of a route to the second wireless device;
the at least one radio is configured to transmit a request message to the third wireless device, wherein the request message requests identification of a current DFS channel over which the second wireless device is operating;

the at least one radio is configured to receive a response message from the third wireless device, wherein the response message identifies the current DFS channel over which the second wireless device is operating; and the processor is configured to establish, using the current DFS channel, a new wireless connection with the second wireless device.

11. The first wireless device of claim 10, wherein the request message and the response message are transmitted over a non-DFS channel.

12. The first wireless device of claim 10, wherein the previous wireless connection used a 5 GHz band DFS channel.

13. The first wireless device of claim 10, wherein the request message and the response message are transmitted over a 2.4 GHz band channel.

14. The first wireless device of claim 10, wherein the second wireless device functions as a network access point.

15. The first wireless device of claim 14, wherein the identity of the current DFS channel is received from the second wireless device through a second network access point.

16. The first wireless device of claim 10, wherein the previous wireless connection was through a first radio of the first wireless device and the request message is transmitted through a second radio of the first wireless device.

17. The first wireless device of claim 10, wherein the wireless network is a mesh network.

18. A first wireless device, comprising:
means for detecting at the first wireless device that a previous wireless connection has been lost with a second wireless device that employs dynamic frequency selection (DFS);
means for identifying, from a routing table of the first wireless device, a third wireless device as a next hop of a route to the second wireless device and transmitting a request message from the first wireless device to the third wireless device, wherein the request message requests identification of a current DFS channel over which the second wireless device is operating;
means for receiving a response message at the first wireless device from the third wireless device, wherein the response message identifies the current DFS channel over which the second wireless device is operating; and
means for establishing at the first wireless device, using the current DFS channel, a new wireless connection with the second wireless device.

* * * * *